United States Patent [19]
Robison

[11] Patent Number: 5,155,595
[45] Date of Patent: Oct. 13, 1992

[54] GENLOCK FREQUENCY GENERATOR

[75] Inventor: Jerel D. Robison, Mountain View, Calif.

[73] Assignee: LSI Logic Corp., Milpitas, Calif.

[21] Appl. No.: 649,033

[22] Filed: Jan. 31, 1991

[51] Int. Cl.$^5$ ............. H04N 5/268; H04N 5/272; H04N 5/275
[52] U.S. Cl. ................ 358/149; 358/158; 358/183; 358/150; 358/22
[58] Field of Search ............. 358/149, 148, 150, 158, 358/22, 181, 183, 17, 19

[56] References Cited

U.S. PATENT DOCUMENTS

| | | | |
|---|---|---|---|
| 4,580,165 | 4/1986 | Patton et al. | 358/148 |
| 4,591,910 | 5/1986 | Lai et al. | 358/148 |
| 4,611,230 | 9/1986 | Nienaber | 358/158 |
| 4,639,765 | 1/1987 | D'Hont | 358/19 |

FOREIGN PATENT DOCUMENTS 60-194679  1/1985  Japan ................. 358/158
2-193468  7/1990  Japan .

*Primary Examiner*—James J. Groody
*Assistant Examiner*—Safet Metjahic
*Attorney, Agent, or Firm*—Michael D. Rostoker; Gerald E. Linden

[57] ABSTRACT

A genlock frequency generation system synchronizes a dependent, or controllable, video source to an independent video source, with the capability of reverting to some predetermined default conditions in the event that no coherent independent video signal is found. The genlock frequency generation system is capable of placing a dependent video image in an arbitrary rectangular area overlaying the independent video image. Method and apparatus are disclosed.

13 Claims, 3 Drawing Sheets

GENLOCK FREQUENCY GENERATOR

TECHNICAL FIELD OF THE INVENTION

The present invention relates to multi-media presentation systems, particularly where video images from two different sources are merged into a single presentation on a single video display monitor.

BACKGROUND OF THE INVENTION

In modern multi-media presentation systems, it is often desirable to merge images from two distinct video sources in a manner such that they overlay one another on the same display screen. Numerous special-effects generators have been designed to accomplish such merging, and provide capabilities such as: split-screen viewing, fades, wipes, and numerous "transparent window" types of effects where a "hole" in one image is created through which a second image may be viewed. Generally, before it is possible to merge two video images in this manner, it is necessary either to provide a display memory where two asynchronous video signals may be merged or to synchronize one video image to another.

If video image merging is to be accomplished without the use of video memory, then the latter technique of synchronization or "locking" of a dependent, or controllable, video source to an independent, or reference, video source is required. This technique is commonly referred to as "genlock", or generator locking, whereby the video signal generator of a dependent source is synchronized or "locked" to an independent video source by decoding and analyzing the timing of the independent source.

Generally, a video signal comprises three components: a signal or signals representing intensity and color, a signal for providing horizontal synchronization, and a signal for providing vertical synchronization. Often, all of the signals are combined into a single composite signal which is referred to as a composite video signal. Many standards have been proposed for the interchange of video information. Some such standards are the NTSC (National Television Standards Committee) specification for broadcast television, which is the present standard for television signal encoding in the United States; the European PAL (Phase Alternate Line) television standard; and the EIA (Electronic Industries Association) RS-170 specification for monochrome composite video. In addition, many specifications for computer generated video have emerged as de facto standards in the personal computer industry Several examples of these are found in the MDA (Monochrome Display Adapter), CGA (Color Graphics Array), and VGA (Video Graphics Array) video display adapters for the PC, PC/XT, and PC/AT personal computers by IBM corporation.

In a computer environment, the object of genlock usually is to synchronize a computer display to a video source, such as a videodisc or VCR, for the purpose of using the video source as background information over which the computer generated data (text and/or graphics) are overlaid.

Genlock is usually implemented through the use of phase-locked loop techniques, widely known in the present art, to synthesize a clock by phase-locking the horizontal sync pulse of a dependent video source (usually a computer display controller) to the horizontal sync pulse of an independent video source. The independent video source could be live video, pre-recorded video, or another computer display.

FIG. 1 is a diagram of a simple genlock system 100 for horizontal synchronization (HSYNC) comprising a phase-locked loop 11 comparator 112, loop filter 114 and voltage controlled oscillator (VCO) 114), and an external graphics controller 150 to lock one horizontal sync pulse 130 to another 120 while simultaneously generating a higher frequency clock signal 140 which is a multiple of the dependent horizontal sync frequency. Typically, this higher frequency clock signal 140 would be used as a master clock to the external graphics controller 150. The VCO 116 would operate at a multiple of the Dependent HSYNC frequency 130 based on an internal divide ratio in the external graphics controller 150. In this manner the horizontal scan rate of the graphics controller 150 is matched to that of the incoming independent video signal 120, whatever its source, and is synchronized such that the horizontal scans of each video source start at the same time. Evidently, stability of the phase locked loop would affect the stability of the dependent video image relative to the independent video image. That is, if there is any significant jitter in the phase-locked loop, there would be a corresponding visible jitter in the dependent video's image when overlaid on the independent video.

Among the shortcomings associated with present genlock systems is that there must be an incoming (independent) video signal for the dependent source to lock onto. If such an incoming signal is not present, then a typical genlock system would drift to some frequency which may not be compatible with the dependent graphics controller or with the display system. In fact, in some cases it is possible to do damage to a display monitor if such a situation should occur. It would therefore be highly desirable to provide an automatic mechanism whereby the absence of a video source or the absence of a coherent input signal will cause the genlock apparatus to generate some pre-specified default frequencies, and such is disclosed herein.

Another difficulty in genlock systems is the synchronization of the vertical components of the video signals. With the horizontal components synchronized, the images will be stable with respect to one another, but the vertical position of the dependent video source would likely be shifted with respect to the independent video image.

Vertical synchronization (VSYNC) is usually accomplished by generating an interrupt (signal) to the source of the dependent video (typically a computer system with a graphic controller) at the time of the independent source's vertical synchronization signal so that the it may reset the dependent source's vertical position at that time. It is desirable to provide a mechanism of establishing vertical synchronization without excessive external processor intervention, and such is disclosed herein.

The most straightforward method of accomplishing frame synchronization is to run the output of a VSYNC comparator into a hardware-based reset of a graphic controller's vertical line counter, such as a Texas Instrument 34010. Since not all controllers have this capability, the present invention overcomes this limitation by interrupting the host system, which is applicable to a broader range of designs.

Further, it is often advantageous to cause a graphics controller to generate an image (dependent video)

which does not cover the entire independent video image. This is difficult using most present genlock systems, and requires a great deal of programming of the graphics controller registers and a non-trivial amount of external logic to accomplish the required masking. Even after this is done, the computer generated data (text and/or graphics) must typically be written to a position other than top left (the most convenient place for a display to start). It is desirable to provide a mechanism to shift the top-left of the dependent source's starting position with respect to that of the independent source, and to control the overall size of the dependent video image within the independent video image, and such is disclosed herein.

DISCLOSURE OF THE INVENTION

It is therefore an object of the present invention to provide a technique for synchronizing a dependent or controlled video source to an independent or reference video source, the process of which is referred to as "genlock" herein, such that the absence of coherent input signals will cause the dependent video synchronization signals to move to some pre-specified default frequencies.

It is a further object of the present invention to provide frame synchronization for graphic controllers lacking a vertical line counter.

It is a further object of the present invention to accomplish genlock while altering the vertical and horizontal position of the dependent video image relative to the independent video image by altering the phase relationships between the independent and dependent synchronization signals.

It is a further object of the present invention to accomplish genlock while providing control over the position and size of the dependent video image relative to the independent video image.

According to the invention, genlock is "built" around a phase-locked loop such that a primary control loop locks a dependent HSYNC (horizontal synchronization signal) from a graphics controller (e.g.) to an independent HSYNC from an independent source by varying the frequency of a master clock to the graphics controller based on the phase difference between the two (dependent and independent) HSYNC signals. The master clock frequency to the graphics controller is derived from the phase-locked loop's voltage-controlled oscillator (VCO). The control sense is such that if the dependent HSYNC lags the independent HSYNC, then the master clock frequency will be increased.

Further according to the invention, there is a sync detect function monitoring the two HSYNC signals for coherence. If either or both HSYNC signals fall outside of pre-specified timing limits, then the sync detect function will generate a signal (SYNC LOSS) indicating that appropriate inputs are not present. This signal is used to disconnect the inputs of the phase-locked loop from the two HSYNC input signals, replacing the independent HSYNC signal with the output of the VCO through a programmable divider, and replacing the dependent HSYNC signal with a fixed reference frequency through a programmable digital divider. By switching the inputs to the phase locked loop in this manner, the output frequency of the VCO (and therefore all of the graphics controller's video timing parameters) is set to a default value when no valid input signals are present.

Further according to the invention, a VSYNC (vertical synchronization signal) comparator independently monitors the relationship between the independent VSYNC and the dependent VSYNC.

If any dependent HSYNC pulses occur between similar edges of the two VSYNC signals, then the system is considered to be out of vertical synchronization, and a vertical reset signal will be generated. This VSYNC comparator forms the basis of an external control loop for locking the dependent video signal into vertical synchronization with the independent video signal.

Further according to the invention, two digital delay lines are provided, one preferably in series with the independent HSYNC signal and one preferably in series with the independent VSYNC signal. These delay lines are independently programmable for delay time. (The delay lines could possibly be located on the dependent HSYNC and VSYNC lines, and some benefit may be derived thereby, but by placing the delays on the independent horizontal and vertical syn lines the dependent video field is kept within the independent video field.) The effect of these delay lines is to delay the horizontal and vertical synchronization points as perceived by the phase-locked loop and the VSYNC comparator, thus causing the dependent HSYNC and dependent VSYNC to become locked in a non-coincident phase relationship with the independent signals. By doing this, it is possible to cause the (dependent) graphics controller to place the top left of its generated video image at a point other than the top left of the independent video image. The greater the vertical delay value, the farther down the dependent image is moved. In like manner, the greater the horizontal delay value, the farther to the right the dependent image is moved.

Further according to the invention, two counters are provided: a programmable vertical line counter (VERT. COUNT) and a programmable horizontal position counter (HORIZ. COUNT). The vertical line counter is started coincident with the dependent VSYNC signal and counts dependent HSYNCs until some pre-specified terminal count condition is reached. The horizontal position counter is started coincident with the dependent HSYNC signal and counts at a rate related to the frequency of the phase-locked loop's VCO until some pre-specified terminal count condition is reached. A field switch signal is generated based upon the state of these two counters. For each horizontal scan line where the vertical counter is "active", that is, for each scan line after the dependent VSYNC but before the vertical counter's scan line count is exhausted, the field switch signal will be set to an "active" state during the time while the horizontal counter is counting. The effect of this is to create a rectangular region within the independent image indicated by the field switch signal. This field switch signal may then be used to switch a video multiplexer between the independent and dependent video signals, creating an overlay effect. As described herein, the "active" state of the field switch signal would ordinarily be used to control the dependent video source's overlay within the independent video image.

Further according to the invention, a transparency signal is used to override a portion of the field switch signal's active state, forcing it to an "inactive" state. This signal may be used by external timing or chroma key circuits to further define "inactive" areas in the dependent video image through which the independent video or other synchronous video source may be viewed. This feature may be used to overlay closely cropped graphics or text into the independent video background.

Other objects, features and advantages of the invention will become apparent in light of the following description thereof.

BRIEF DESCRIPTION OF THE DRAWINGS

FIG. 3b is a timing diagram showing the relationship between dependent and independent synchronization signals corresponding to the display example of FIG. 3a.

DETAILED DESCRIPTION OF THE INVENTION

Figure 1:
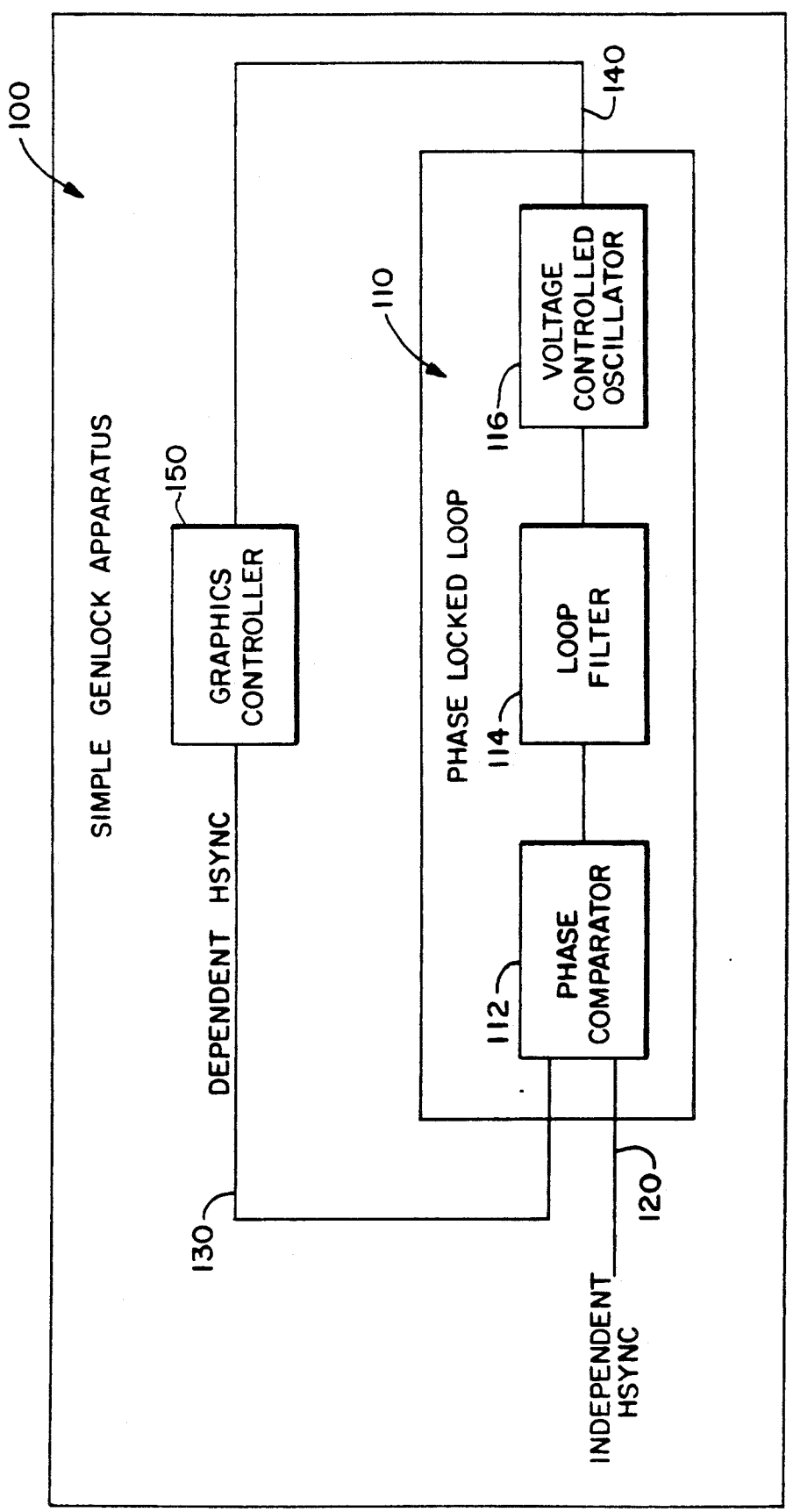
FIG. 1 is a simplified block diagram of a prior art phase-locked loop based genlock system by which a dependent horizontal synchronization signal may be locked to an independent horizontal synchronization signal.

FIG. 1 is a simplified block diagram of a genlock apparatus of the prior art, and has been discussed.

Figure 2:
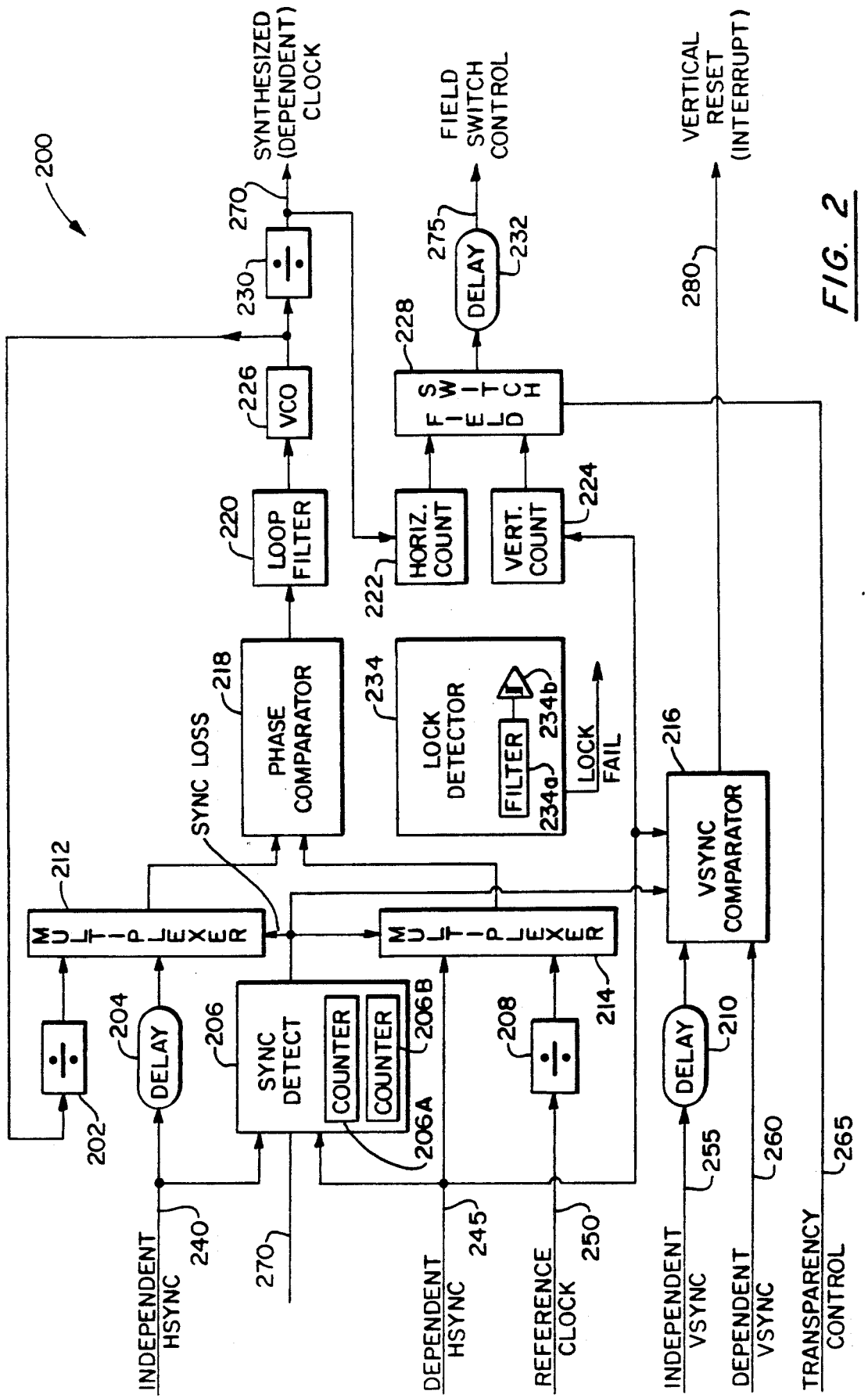
FIG. 2 is a block diagram of the genlock frequency generator of the present invention.

FIG. 2 is a block diagram of a genlock frequency generator 200 of the present invention comprising a "primary" horizontal synchronization control loop, a "secondary" vertical synchronization control circuit, and a field switch control circuit.

The horizontal synchronization control loop is based on a phase-locked, frequency synthesis loop comprising digital dividers 202, 208 and 230; digital delay 204; synchronization detector 206; multiplexers 212 and 214; phase comparator 218; loop filter 220; lock detector 234; and VCO 226. (The presence of a digital divider in the frequency feedback path of the phase-locked loop has the effect of "synthesizing" frequencies other than those at the phase comparator input by causing the VCO to oscillate at higher frequency than would otherwise be required to maintain lock. Hence the terminology "frequency synthesis".) Because of the widespread use and understanding of phase-locked loops in the present art, the details of its capture mechanism and design criteria will not be discussed herein.

An independent HSYNC signal 240 and a dependent HSYNC signal 245 are the "normal" (non-default) inputs to the phase-locked frequency synthesis loop, and the generated output is a synthesized (or dependent) clock signal 270. The phase-locked frequency synthesis loop locks the dependent HSYNC signal 245 into a fixed-phase relationship with the independent HSYNC signal 240 via an externally controllable video source (not shown, compare graphics controller 150 of FIG. 1), the timing of which is controlled by the synthesized clock 270. The phase difference between the two HSYNC signals is controlled by a programmable digital delay 204 in the path of the independent HSYNC signal.

The HSYNC signals are provided to the phase comparator 218 through a pair of multiplexers 212 and 214. These multiplexers are both controlled by the output of a synchronization detector 206, and are connected such that if "valid" synchronization signals are present, then the inputs to phase comparator 218 are taken from dependent HSYNC signal 245 and the output of HSYNC delay 204. If valid synchronization signals are not present, then the inputs to phase comparator 218 are taken from the outputs of the VCO divider 202 and the reference divider 208. Divider 202 is connected at its input to the a reference clock signal 250. The divider 208 is connected at its input to the VCO output. The two dividers 202 and 208 are programmable and determine the frequency at which VCO 226 will oscillate when valid synchronization signals are not present. This "default" frequency is given by:

VCO frequency=(reference frequency)*(divider 202 ratio)/(divider 208 ratio)

For example, if divider 202 is set to divide by 3 and divider 208 is set to divide by 4, then if the reference clock 250 frequency is 50 Mhz, the VCO frequency will default to:

$$50\ MHz * 3 / 4 = 37.5\ MHz$$

This default condition will occur if either or both HSYNC signals fall outside of preset timing parameters as determined by synchronization detector 206.

Sync detector 206 monitors the presence and rate of both incoming HSYNC signals 240 and 245. If either HSYNC source is missing, then it is desirable to switch the frequency source to some default value before the missing HSYNC signal causes the VCO to wander to one extreme or another. The criterion for determining that an HSYNC signal is missing is that a counter 206a times out between two successive occurrences of a particular HSYNC signal. This counter is loaded with a selected maximum value and is started counting down upon the recognition of a leading edge of either HSYNC signal (240 or 245) at a rate determined by synthesized clock 270. The counter counts down until successive leading edges are seen on both HSYNC signals. If the count reaches zero, then an output signal (SYNC LOSS) is generated indicating that valid synchronization signals are not present.

In a similar manner, the independent HSYNC signal 240 may be monitored for noisy or unexpectedly fast operation. To this end, another counter 206b in the sync detector 206 is loaded (programmed) with a selected minimum count value when the leading edge of the independent HSYNC signal 240 is detected. The counter decrements at a rate determined by synthesized clock 270 until it receives the next positive edge of the independent HSYNC signal 240. If the count has not reached zero by this time, then an output signal is generated indicating that valid synchronization signals are not present.

In any case where the sync detector 206 issues a default signal (sync loss) to the multiplexers 212 and 214, the divided VCO output and reference clock are provided in the loop in place of the independent and dependent HSYNC signals.

A lock detector 234 monitors the phase-lock condition during frequency transitions, e.g., when synchronizing to a newly applied independent video source (Independent HSYNC) or when moving to the default condition due to loss of synchronization. An error signal (output) of the phase comparator is provided via a filter 234a to a voltage comparator 234b. The voltage comparator is designed with a hysteresis feedback loop (positive feedback around the comparator) to allow small deviations in the output before generating a lock failure indication (LOCK FAIL). The lock failure indication may be monitored (by an external system, not shown) to indicate transition to a new frequency so that external display activity may be paused while the genlock system is settling. Return of the lock failure indication to its normal non-failure state indicates that the genlock process is complete and display activities may resume. Monitoring the output of sync detector 206 (SYNC LOSS) will indicate whether the new stable state is due to a valid video input or to loss of synchronization and implementation of the default mode of operation.

The secondary, vertical synchronization circuit includes a programmable digital delay circuit 210 and a VSYNC comparator 216. The VSYNC comparator forms the basis of an externally-closed phase-locked loop. Independent VSYNC signal 255 (from an external video source, not shown) is connected to the input of the digital delay circuit 210, the output of which is connected to one input of the VSYNC comparator 216. Dependent VSYNC signal 26 is connected directly to the other input of VSYNC comparator 216. The two inputs are monitored by VSYNC comparator 216, and if a leading edge of dependent HSYNC signal 245 is detected in between the leading edges of the output of digital delay 210 and dependent VSYNC signal 260, then an output signal 280 (Vertical Reset) is generated indicating that the genlock system is out of vertical synchronization. Typically, this signal would be used as an interrupt signal to an external processor system (not shown) controlling the dependent video source, which would then reset the vertical line controls therein, effectively placing the genlock system into vertical synchronization. It should be noted that the VSYNC comparator 216 will only generate the vertical reset signal 280 if the genlock system is out of vertical synchronization. This signal will not be generated after vertical synchronization has been established.

Because the output of the digital delay circuit 210, rather than the independent VSYNC signal 255 itself, is monitored by the VSYNC comparator 216, a fixed vertical offset is created for the dependent video source relative to the independent video source, as determined by the delay value programmed into the digital delay circuit 210. In like manner, the delay circuit 204 in the independent HSYNC line creates a fixed horizontal offset of the dependent video source.

It should be noted that the delay circuits 204 and 210 could be placed in the dependent HSYNC and VSYNC lines. Further, the reference clock could be associated with the independent HSYNC rather than with the dependent HSYNC, and the divided VCO output could be associated with the dependent rather than independent HSYNC.

The genlock system's field switch control includes a horizontal position counter 222, a vertical line counter 224, field switch logic 228 and a digital delay line 232, and produces a field switch control output 275. Such a signal (Field Switch Control) is required when switching between a background field (usually provided by the independent video source) and the overlaid video (usually provided by the dependent video source). The conditions for field switching are provided by the independent HSYNC signal 240, the independent VSYNC signal 255, the outputs of the horizontal position counter 222 and vertical line counter 224, and the state of a transparency input 265. The effect of the field switch control signal 275 is to create a rectangular area (320, see FIG. 3a) within the independent video image (310, see FIG. 3a) which is defined on the left edge by the dependent HSYNC signal 245, on the right edge by the count value in the horizontal position counter 222, on the top by the dependent VSYNC signal 260, and on the bottom by the value in vertical line counter 224. The vertical line counter 224 is loaded with its count value and is set active upon detection of the leading edge of the dependent VSYNC signal 260, and counts down at a rate of one count per dependent HSYNC leading edge (245) until it reaches zero, at which point it is set inactive. On each horizontal scan line where the vertical line counter 224 is active, horizontal position counter 222 is loaded with its count value and is set active when the leading edge of the dependent HSYNC signal 245 is detected. Horizontal position counter 222 then counts down at a rate determined by the synthesized clock 270 (effectively a dependent pixel clock), until it reaches zero, at which time it is set inactive.

Figure 3A:
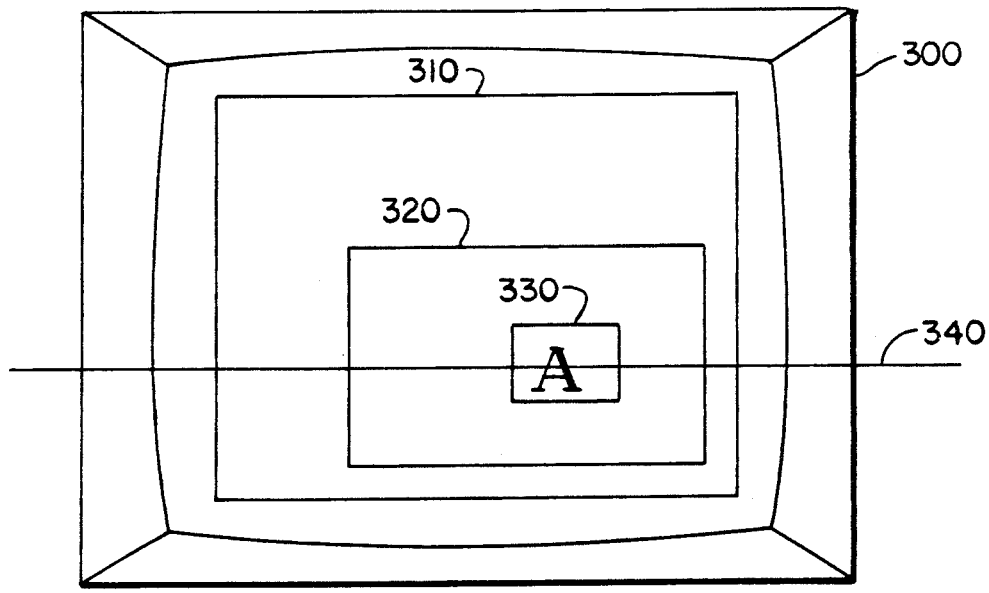
FIG. 3a is a diagrammatic view of a video monitor showing the display relationship between an independent video image and a dependent video image which has been synchronized and shifted relative thereto by the genlock frequency generator of FIG. 2.
Figure 3B:
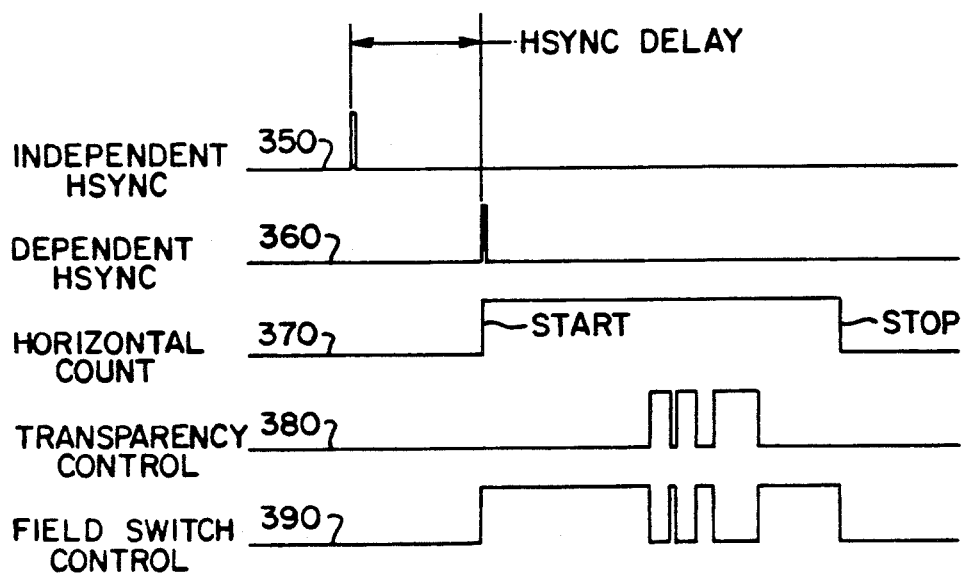

At any point where both counters (222 and 224) are active at the same time, the field switch 228 changes its output state, providing a signal (390, FIG. 3b) which may be overridden by the transparency input 265 (see 380 FIG. 3b). The transparency input 265 is effective as an override of the field switch output. This may be used by external circuitry to provide close cropping of dependent text and/or graphics or additional blanking.

Because of the use of the delay lines 204 and 210 on the independent HSYNC 240 and independent VSYNC 255 lines, the overlaid (dependent) image is guaranteed to reside entirely within the independent image.

A field switch delay 232 is provided to accommodate those situations where the active graphics field for the dependent source does is complete prior to resetting of the horizontal counter 222. It can also be used when additional time is required to move data through a color lookup table prior to mixing with the background (independent) field.

FIG. 3a shows an example of a resultant display on a video monitor 300, where a rectangular dependent video field 320 is offset and overlaid on an independent video background field 310, and where the transparency control is employed to create a transparent region 330 within the overlaid dependent field 320 within which the independent video background field is presented. A reference line 340 is drawn through the display at a point where corresponding signals are shown in FIG. 3b.

FIG. 3b shows five significant sample signals corresponding to those that would occur for the horizontal scan line indicated on FIG. 3a by reference line 340. Making simultaneous reference to FIGS. 3a and 3b, Independent HSYNC signal 350 (240 with respect to FIG. 2) defines the left edge of the independent background field 310. Dependent HSYNC signal 360 (245 with respect to FIG. 2) occurs after a period equal to the HSYNC delay has expired (204 with respect to FIG. 2). Horizontal position count 370 (222 with respect to FIG. 2) starts with the horizontal counter 222, and stops when its count value reaches zero. The period where this counter is "active" defines the left and right edges of the overlaid dependent graphics field 320. Transparency control 380 (265 with respect to FIG. 2) has an active period during the active period of the horizontal position counter and defines the left and right edge of a transparent region 330 within the overlaid dependent graphics field 320 through which the independent background image 310 may be seen. In this case, the transparency control signal 380 is modulated to permit a closely cropped portion (shown as the letter "A") of the dependent video image to overlay the independent video image within the window. The "net" field switch control output (275, FIG. 2) is shown at 390.

Appendix

Appended hereto as part of the present disclosure is a document entitled "GENLOCK FREQUENCY GENERATOR", dated Jun. 27, 1990.

APPENDIX
GENLOCK FREQUENCY GENERATOR

FEATURES

* Facilitates the synchronization of any graphics controller to another video or graphics source.
* Frame synchronization.
* Generates frequencies up to 110 MHz.
* Switches to a programmable default frequency in the absence of HSYNC.
* Programmable size and position of overlayed graphics field
* Second independent, programmable frequency source for background graphics.
* Low power CMOS technology.
* 28 pin DIP, PLCC.

APPLICATIONS

This genlock frequency generator can be used to synchronize any graphics controller to another video or graphics source. It can be used in systems where graphics is overlayed onto a video or graphics background. For multi-media applications a graphics field of any size can be established anywhere within the background field. Video capture systems can use the device to synchronize memory accesses to the video signal.

GENERAL DESCRIPTION

This device takes in two HSYNC signals and generates a variable clock frequency based on the phase relation of the two signals. In the event that one or both of the sync signals is absent, the device will switch to a programmable default fequency. This switching is controlled by a programmable sync detection circuit which monitors the incoming signals. VSYNC signals can also be monitored to determine proper frame synchronization. The device initiates an interrupt in the event that a HSYNC signal is received in between similar edges of the two VSYNC signals. The dependent graphics field may be shifted horizontally or vertically with respect to the independent video or graphics source. Programmable delay lines on the incoming sync signals create this phase shift. In addition this device outputs a signal which can be used to control an external switch or mixer. This signal will be active from the end of HSYNC until the end of the user programmable field length. A LOCK indicator can be read to determine whether the phase-locked loop has acheived its target frequency. A second independent, programmable frequency generator is included for those applications involving two graphics controllers.

BLOCK DIAGRAM

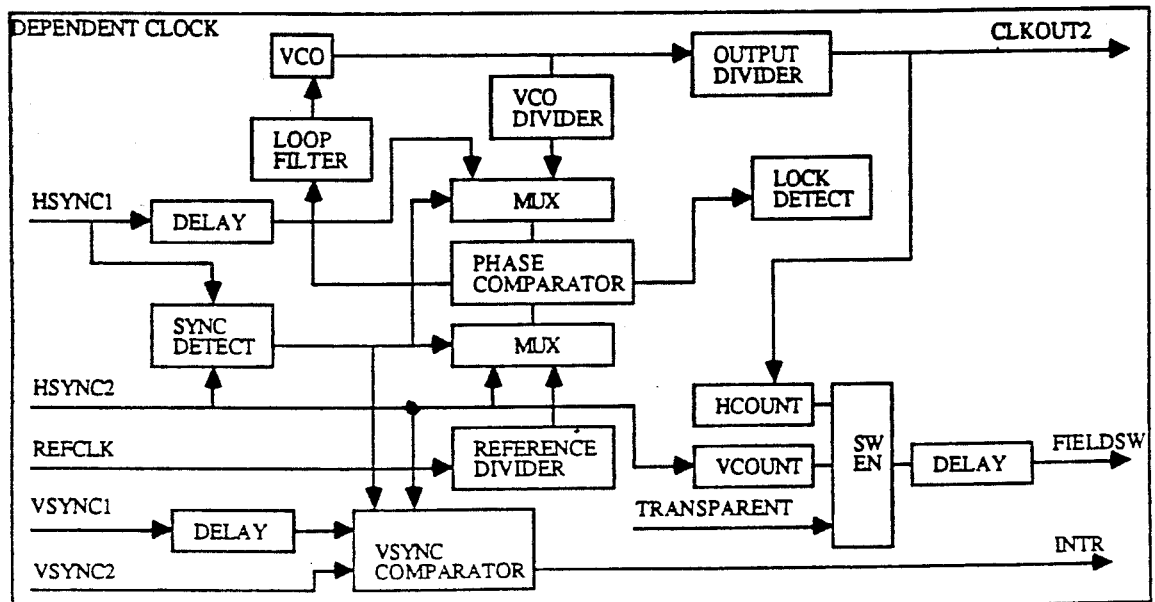

ADVANCED INFORMATION

PIN DESCRIPTION

| PIN NAME | PIN # | PIN TYPE | DESCRIPTION |
|---|---|---|---|
| XTAL1/REFCLK | | INPUT | EXTERNAL CRYSTAL OR REFERENCE CLOCK INPUT |
| XTAL2 | | OUTPUT | EXTERNAL CRYSTAL |
| HSYNC1 | | INPUT | HSYNC FROM INDEPENDENT SOURCE |
| HSYNC2 | | INPUT | HSYNC FROM DEPENDENT SOURCE |
| VSYNC1 | | INPUT | VSYNC FROM INDEPENDENT SOURCE |
| VSYNC2 | | INPUT | VSYNC FROM DEPENDENT SOURCE |
| CLKOUT1 | | OUPUT | OUTPUT CLOCK FOR INDEPENDENT GRAPHICS SOURCE |
| CLKOUT2 | | OUPUT | OUTPUT CLOCK FOR DEPENDENT GRAPHICS SOURCE |
| INTR | | OC OUTPUT | INTERRUPT |
| FIELDSW | | OUTPUT | CONTROL FOR EXTERNAL VIDEO MIXER |
| TRANSPARENT | | INPUT | ADDITIONAL BLANKING FOR DEPENDENT GRAPHICS |
| VCCD | | POWER | |
| VCCA | | POWER | |
| DGND | | GND | |
| AGND | | GND | |
| LPF1 | | PASSIVE | LOOP FILTER, INDEPENDENT SOURCE |
| LPF2 | | PASSIVE | LOOP FILTER, DEPENDENT SOURCE |
| RD* | | INPUT | HOST INTERFACE READ STROBE |
| WR* | | INPUT | HOST INTERFACE WRITE STROBE |
| CS* | | INPUT | CHIP SELECT, ADDRESS DECODE |
| D7 | | BI-DIR | HOST INTERFACE DATA BITS |
| D6 | | BI-DIR | |
| D5 | | BI-DIR | |
| D4 | | BI-DIR | |
| D3 | | BI-DIR | |
| D2 | | BI-DIR | |
| D1 | | BI-DIR | |
| D0 | | BI-DIR | |

ADVANCED INFORMATION

GENLOCK FREQUENCY GENERATOR

DETAILED DESCRIPTION

This device is designed to synchronize a graphics source framed by HSYNC and VSYNC signals to another video or graphics source that is also framed by HSYNC and VSYNC signals. The video or graphics source being synchronized to is called the independent source since, in general, the user has no control over the timing parameters of the sync signals. The graphics source that is being synchronized to the independent source is called the dependent source since the timing parameters result from the synchronization effect and are not user selectable. Normally the independent source forms the basis for the backgound video or graphics. The monitor is set up to handle the sync parmeters of this source. The dependent source forms the overlay or inset graphics. The overlay graphics may cover all or just some of the background.

PHASE COMPARATOR

The phase comparator receives two synchronization signals and outputs an error signal into the loop filter. The loop filter smooths and transforms this signal into a voltage going into the VCO. The value of the error signal depends on the phase relation of the two synchronization signals. Normally a feedback path exists from the output of the VCO to the input of the comparator in order to form a phase-locked loop. Using the feedback loop the VCO output can be varied to provide zero phase difference between the synchronization signals.

For the independent source, one of the synchronization signals to the comparator comes from the VCO DIVIDER. The other synchronization signal comes from an external frequency source or crystal and gets divided by the REF DIVIDER before entering the phase comparator. In a phase-locked condition a subharmonic of the VCO clock will equal in frequency and phase, the subharmonic of the REFCLK.

$$\frac{REF\ FREQ}{REF\ DIVIDER} = \frac{VCO\ FREQ}{VCO\ DIVIDER}$$

This description also applys to the dependent frequency generator when it is operating in the default fequency mode. However the dependent frequency generator also operates in the genlock mode, in which case the phase comparator receives the HSYNC strobes coming into the device. The equation then becomes $$\frac{CLKOUT2}{HTOTAL} = HSYNC1\ PERIOD$$

where HTOTAL is the total dotclocks per horizontal scan that is programmed into a graphics controllers operating registers.

The registers VCO DIVIDER, REF DIVIDER and OUTPUT DIVIDER should be programmed to acheive a target output frequency. The allowable values for both the VCO and reference frequency dividers are from 3 to 127. The VCO output before the output divide should not run above the maximum allowable frequency of 110 MHz, and the ratio of VCO to reference frequency dividers should not exceed 15. In order to prevent erroneous operation, the VCO DIVIDER and REF DIVIDER registers have input buffers between the registers and the host interface. These buffers may be loaded with values by writing to the device at the respective indices. A read of the device will not immediately show the new values since a read operation only provides the contents of the operating registers. The new values will be moved into the operating registers only after a write operation is performed to the OUTPUT DIVIDER register. Therefore new values for VCO DIVIDER and REF DIVIDER should be entered first followed by a write to the OUTPUT DIVIDER register.

Both the dependent and the independent clock generators will power up to 25.175 MHz based on a 14.31818 MHz reference source.

---

ADVANCED INFORMATION

GENLOCK FREQUENCY GENERATOR

SYNC DETECT

The dependent frequency generator contains features designed to prevent erroneous operation. A sync detection circuit monitors the incoming HSYNC signals to determine if HSYNC is present and is occuring at a predictable rate. If either HSYNC source is missing, then it is desirable to switch the frequency source to some default value before the missing sync signal causes the VCO to wander to one extreme or the other. The criteria for a sync signal to be missing is that a counter is allowed to time out between two occurances of HSYNC. This counter is loaded with the contents of the SYNC DETECT COUNT MAX register upon the receipt of a positive edge of either HSYNC signal. The clock input to the counter is the dependent clock prescaled by 7 bits. The counter decrements until it has received the next both positve edges both HSYNC strobes. If the count reaches zero, the device switches to the default frequency mode and the VSYNC comparison circuit is disabled. An interrupt can be made to occur on HSYNC failure by setting the HSYNC SLOW INTERRUPT ENABLE bit in the CONTROL register.

Similarly the HSYNC signals may be monitored for noisy or unexpectedly fast HSYNC signals. A counter is loaded with the contents of the SYNC DETECT COUNT MIN register upon receiving the positive edge of the independent HSYNC signal. The clock input to the counter is the dependent clock prescaled by 7 bits. The counter decrements until it receives the next positive edge of the independent HSYNC signal. If the count has not reached zero by this next edge then the device switches to the default frequency mode and the VSYNC comparison circuit is disabled. An interrupt can be made to occur if HSYNC is found to be fast or noisy by setting the HSYNC FAST INTERRUPT ENABLE bit in the CONTROL register.

The sync detection circuit will continuously monitor the HSYNC signals while in the default frequency mode. If the signals later meet the criteria set up by the SYNC DETECT COUNT MAX and SYNC DETECT COUNT MIN registers, the circuit will revert to the genlock mode providing that the GENLOCK ENABLE bit in the CONTROL register is set.

FIELD POSITIONING

The dependent graphics field may be shifted horizontally or vertically with respect to the background field by phase shifting the HSYNC and VSYNC signals respectively. The phase shift is created by internally delaying the independent sync signal before it reaches the phase comparator. In order to maintain a phase-locked condition the dependent sync input will be delayed by a similar amount with respect to the independent sync input. For HSYNC, a counter clocked by the dependent clock is used to form the delay. By programming the HSYNC DELAY registers, the graphics field may be shifted horizontally by an integral number of CLKOUT clocks. For VSYNC, a counter clocked by the dependent HSYNC clock is used to form the delay. By programming the VSYNC DELAY register, the graphics field may be shifted vertically by an integral number of scan lines. This method of vertical shifting is only applicable to systems which support the feedback loop through interrupt handling.

VSYNC COMPARATOR

The VSYNC comparator is the basis for a phase-locked loop. The comparator receives two VSYNC signals and generates an interrupt when the signals are not aligned. To complete the feedback loop the system must acknowledge this interrupt and set the line count register in the dependent graphics controller accordingly. If the VSYNC inputs occur simultaneously, no interrupt is generated. If an HSYNC signal is received in between the positive edges of the two VSYNC signals, an interrupt is generated provided that the device is operating in the genlock mode and provided that the FRAME SYNC FAILURE INTERRUPT ENABLE bit is set in the CONTROL register.

LOCK DETECT

Lock detection provides a means to monitor the phase-lock condition during frequency transitions. The error signal from the phase comparator is fed into a filter and then into a voltage comparator. The voltage comparator is designed with a hysterisis

---

ADVANCED INFORMATION feedback loop to allow small deviations in the output before generating a lock failure condition. An interrupt can be made to occur for this condition by setting the LOCK FAILURE INTERRUPT ENABLE bit in the CONTROL register. An interrupt can also be made to occur for a lock detect condition by setting the LOCK DETECT INTERRUPT ENABLE bit in the CONTROL register. A lock failure interrupt can be used to indicate noise on the HSYNC lines or improper programming of the graphics controller registers. The lock detect interrupt can be used to monitor arrival at a new frequency when switching frequencies. Interrupts for both conditions can not be simultaneously enabled. The alternate bit in the CONTROL register will be reset if this is attempted.

DEPENDENT FIELD SIZE

A rectangular field may be defined for the inset, dependent graphics field by programming the horizontal and vertical field count registers. The horizontal field counter is loaded with the value of 'the HORZ FIELD COUNT registers following the end of the dependent HSYNC strobe. An enable signal is issued to the SWITCH ENABLE circuit while the counter is decremented by the dependent CLKOUT clock until zero. Similarly the vertical field counter is loaded with the value of VERT FIELD COUNT registers following the end of the dependent VSYNC strobe. An enable signal is issued to the SWITCH ENABLE circuit while the counter is decremented by the dependent HSYNC strobe.

FIELD SWITCH

The device can be programmed to output a signal used to control an external video switch or mixer. Such a signal is required when switching between the background field and the overlayed graphics. This feature can be enabled by setting the FIELD SWITCH ENABLE bit in the CONTROL register. The conditions for field switching are provided by the HSYNC and VSYNC of the independent source, the output of the field size counters for the dependent source, and the state of the transparency input signal. The overlayed graphics field will be defined on the left edge by the dependent HSYNC, on the right edge by the HORZ FIELD COUNT, at the top by the dependent VSYNC, and at the bottom by the VERT FIELD COUNT. In addition switching to the overlayed graphics field will be overridden by the HSYNC and VSYNC of the independent source. The overlayed graphics will reside entirely within the confines of the background field. In addition the device has a transparency input pin which allows the field switch to be overridden through external circuitry. This allow the use of additional blanking or closely cropped text and graphics.

FIELD SWITCH DELAY

A delay may be inserted into the field switch signal. The FIELD SWITCH DELAY register contains the number of dependent CLKOUT clocks by which the field switch signal is delayed. This delay is used to accomodate those situations where the active graphics field for the dependent source does not align with the end of HSYNC for that source. It can also be used when additional clocks are required to move data through a look up table prior to mixing with the background field.

ADVANCED INFORMATION

GENLOCK FREQUENCY GENERATOR

REGISTER DESCRIPTION

All registers within the device may be accessed at the same physical address. This is done so that this 8 bit device may be used on wider system buses without concern for data paths at even and odd addresses. Instead an index register is provided. This index register is accessed by setting bit 7 low during a write to the device, and using bits 0 thru 6 to select the indexed register. The register selected by the index can be accessed during a write operation by setting bit 7 high during that operation. Bit 7 will always be set to 1 during a read from the device. The contents of INDEX REGISTER will be auto-incremented following either a read or a write to any of the indexed registers.

INDEX REGISTER

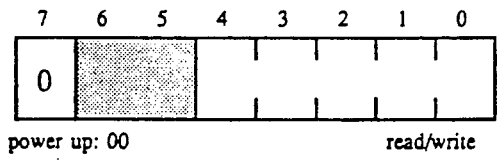

power up: 00                                     read/write

This register indexes the other data registers in the device. Bit 7 of the data word must be zero inorder to write to this register.

| Reg # | Register Name |
|---|---|
| 00 | Control Register |
| 01 | Status Register; read only |
| 02 | VCO Divider 1 |
| 03 | REF Divider 1 |
| 04 | Output Divider 1 |
| 05 | VCO Divider 2 |
| 06 | REF Divider 2 |
| 07 | Output Divider 2 |
| 08 | HSYNC Delay MSB |
| 09 | HSYNC Delay LSB |
| 0A | VSYNC Delay MSB |
| 0B | VSYNC Delay LSB |
| 0C | SYNC Detect Count Max |
| 0D | SYNC Detect Count Min |
| 0E | Horz Field Count MSB |
| 0F | Horz Field Count LSB |
| 10 | Vert Field Count MSB |
| 11 | Vert Field Count LSB |
| 12 | Field Switch Delay |

00: CONTROL REGISTER

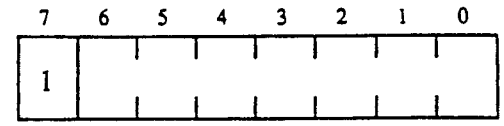

power up:80                                     read/write

| Bit # | Description |
|---|---|
| 0 | Genlock Enable |
| 1 | Field Switch Enable |
| 2 | HSYNC Fast Interrupt Enable |
| 3 | HSYNC Slow Interrupt Enable |
| 4 | Frame Sync Fail Interrupt Enable |
| 5 | Lock Detect Interrupt Enable |
| 6 | Lock Failure Interrupt Enable |
| 7 | 1 |

01: STATUS REGISTER

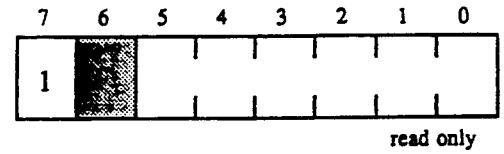

read only

| Bit # | Description |
|---|---|
| 0 | Interrupt trigger status |
| 1 | HSYNC Fast Failure Status |
| 2 | HSYNC Slow Failure Status |
| 3 | Fame Sync Failure Status |
| 4 | Lock Status 1 |
| 5 | Lock Status 2 |
| 6 |  |
| 7 | 1 |

ADVANCED INFORMATION

02: VCO DIVIDER 1

```
 7   6   5   4   3   2   1   0
┌───┬───────────────────┬───────┐
│ 1 │MSBit          LSBit│
└───┴───────────────────┴───────┘
```
power up: 6D                    read/write The VCO clock frequency for the independent clock source is divided by the numerical contents of this register before the signal enters the phase comparator of the independent frequency generator. When loading a divider value into the device the new value will not be acknowledged or returned on a read operation until the entire phase-locked loop parameters are loaded by writing to the OUTPUT DIVIDER 1 register at index 04.

03: REF DIVIDER 1

```
 7   6   5   4   3   2   1   0
┌───┬───────────────────────────┐
│ 1 │MSBit          LSBit│
└───┴───────────────────────────┘
```
power up: 3E                    read/write The REFCLK clock frequency that is an input into the device is divided by the numerical contents of this register before the signal enters the phase comparator of the independent frequency generator. When loading a divider value into the device the new value will not be acknowledged or returned on a read operation until the entire phase-locked loop parameters are loaded by writing to the OUTPUT DIVIDER 1 register at index 04.

04: OUTPUT DIVIDER 1

```
 7   6   5   4   3   2   1   0
┌───┬───────────────────┬───────┐
│ 1 │                   │       │
└───┴───────────────────┴───────┘
```
power up: 00                    read/write The VCO clock frequency for the independent clock source is divided by the numerical contents of this register before the signal leaves the device as CLKOUT1. Bits 0 and 1 are set according to the following table. When loading new phase-locked loop values, this register should be loaded last. a write to this register loads both this value and the previous entered values for VCO DIVIDER 1 and REF DIVIDER 1 written to registers 02 and 03.

00    CLKOUT1 equals VCO1
01    CLKOUT1 equals VCO1 divided by 2
10    CLKOUT1 equals VCO1 divided by 4
11    CLKOUT1 equals VCO1 divided by 8.

05: VCO DIVIDER 2

```
 7   6   5   4   3   2   1   0
┌───┬───────────────────────────┐
│ 1 │MSBit          LSBit│
└───┴───────────────────────────┘
```
power up: 6D                    read/write The VCO clock frequency for the dependent clock source is divided by the numerical contents of this register before the signal enters the phase comparator of the dependent frequency generator. When loading a divider value into the device the new value will not be acknowledged or returned on a read operation until the entire phase-locked loop parameters are loaded by writing to the OUTPUT DIVIDER 2 register at index 07.

ADVANCED INFORMATION

06: REF DIVIDER 2

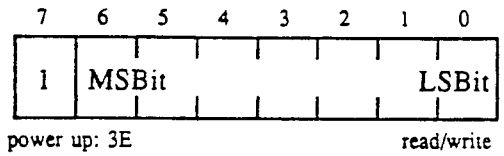

power up: 3E  read/write

The REFCLK clock frequency that is an input into the device is divided by the numerical contents of this register before the signal enters the phase comparator of the dependent frequency generator. When loading a divider value into the device the new value will not be acknowledged or returned on a read operation until the entire phase-locked loop parameters are loaded by writing to the OUTPUT DIVIDER 2 at register 07.

07: OUTPUT DIVIDER 2

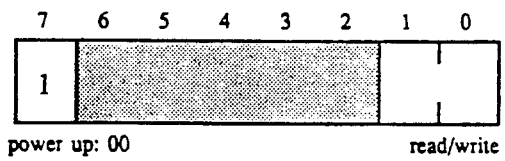

power up: 00  read/write

The VCO clock frequency for the dependent clock source is divided by the numerical contents of this register before the signal leaves the device as CLKOUT2. Bits 0 and 1 are set according to the following table. When loading new phase-locked loop values, this register should be loaded last. a write to this register loads both this value and the previous entered values for VCO DIVIDER 2 and REF DIVIDER 2 written to registers 05 and 06.2

00    CLKOUT2 equals VCO2
01    CLKOUT2 equals VCO2 divided by 2
10    CLKOUT2 equals VCO2 divided by 4
11    CLKOUT2 equals VCO2 divided by 8.

08: HSYNC DELAY MSB

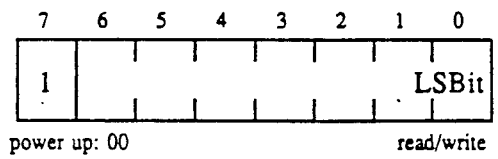

power up: 00  read/write

This register contains the Most Significant 7 bits of the number controlling the phase shift of the two HSYNC signals during the phase lock condition. The phase shift may be altered by an integral number of CLKOUT clocks. When loading a new delay factor into the device this register should be loaded first The MSB of the new delay will not be acknowledged until the LSB register is written. The MSB of the new delay will not be returned on a read operation until the entire number is loaded by writing to the LSB..

09: HSYNC DELAY LSB

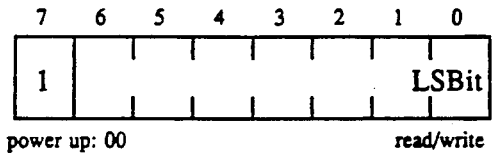

power up: 00  read/write

This register contains the Least Significant 7 bits of the number controlling the phase shift of the two HSYNC signals during the phase lock condition. The phase shift may be altered by an integral number of CLKOUT clocks. When loading a new delay factor into the device this register should be loaded last. A write to this register loads both this value and the previous entered value for the MSB written to index register 08.

ADVANCED INFORMATION

0A: VSYNC DELAY MSB

| 7 | 6 | 5 | 4 | 3 | 2 | 1 | 0 |
|---|---|---|---|---|---|---|---|
| 1 | MSBit | | | | | | | power up: 00        read/write

This register contains the Most Significant 7 bits of the number controlling the phase shift of the two VSYNC signals. The phase shift may be altered by an integral number of HSYNC strobes. When loading a new delay factor into the device this register should be loaded first. The MSB of the new delay factor will not be acknowledged until the LSB register is written. The MSB of the new delay will not be returned on a read operation until the entire number is loaded by writing to the LSB at register 0B.

0B: VSYNC DELAY LSB

| 7 | 6 | 5 | 4 | 3 | 2 | 1 | 0 |
|---|---|---|---|---|---|---|---|
| 1 | | | | | | | LSBit | power up: 00        read/write

This register contains the Least Significant 7 bits of the number controlling the phase shift of the two VSYNC signals. The phase shift may be altered by an integral number of HSYNC strobes. When loading a new delay factor into the device this register should be loaded last. A write to this register loads both this value and the previous value for VSYNC DELAY MSB written to register 0A.

0C: SYNC DETECT COUNT MAX

| 7 | 6 | 5 | 4 | 3 | 2 | 1 | 0 |
|---|---|---|---|---|---|---|---|
| 1 | MSBit | | | | | | LSBit | power up: FF        read/write

This register contains the maximum amount of CLKOUT clocks which are allowed from either of the last HSYNC strobes before the sync detect circuit switches the inputs to the phase comparator. An interrupt can be made to happen when this switching occurs. The frequency input to this counter is prescaled by 7 bits.

0D: SYNC DETECT COUNT MIN

| 7 | 6 | 5 | 4 | 3 | 2 | 1 | 0 |
|---|---|---|---|---|---|---|---|
| 1 | MSBit | | | | | | LSBit | power up: 00        read/write

This register contains the minimum amount of CLKOUT clocks which are allowed form the last independent HSYNC strobe inorder to avoid switching into the default frequency mode. An interrupt can be made to occur when this parameter is not met indicating potential noise on the independent HSYNC signal. The frequency input to this counter is prescaled by 7 bits.

0E: HORZ FIELD COUNT MSB

| 7 | 6 | 5 | 4 | 3 | 2 | 1 | 0 |
|---|---|---|---|---|---|---|---|
| 1 | MSBit | | | | | | | power up: FF        read/write

This register contains the the Most Significant 7 bits of the dependent graphics field width. This downcounter is loaded at the end of the dependent HSYNC strobe and counts the number of CLKOUT clocks until zero. When loading a new horizontal field count into the device this register should be loaded first. The MSB of the new horizontal field width will not be acknowledged until the LSB register is written. The MSB value will not be returned on a read operation until the entire number is loaded by writing to the LSB at register 0F.

ADVANCED INFORMATION

GENLOCK FREQUENCY GENERATOR

0F: HORZ FIELD COUNT LSB

| 7 | 6 | 5 | 4 | 3 | 2 | 1 | 0 |
|---|---|---|---|---|---|---|---|
| 1 | | | | | | | LSBit | power up: FF      read/write

This register contains the the Least Significant 7 bits of the dependent graphics field width. This downcounter is loaded at the end of the dependent HSYNC strobe and counts the number of CLKOUT clocks until zero. When loading a new horizontal field width into the device this register should be loaded last. A write to this register loads both this value and the previous entered value for the MSB written to index register OE.

10: VERT FIELD COUNT MSB

| 7 | 6 | 5 | 4 | 3 | 2 | 1 | 0 |
|---|---|---|---|---|---|---|---|
| 1 | MSBit | | | | | | | power up: FF      read/write

This register contains the the Most Significant 7 bits of the dependent graphics field height. This downcounter is loaded at the end of the dependent VSYNC strobe and counts the number of HSYNC strobes until zero. When loading a new vertical field count into the device this register should be loaded first. The MSB of the new vertical field count will not be acknowledged until the LSB register is written. The MSB of the vertical field count will not be returned on a read operation until the entire number is loaded by writing to the LSB at register 11.

11: VERT FIELD COUNT LSB

| 7 | 6 | 5 | 4 | 3 | 2 | 1 | 0 |
|---|---|---|---|---|---|---|---|
| 1 | | | | | | | LSBit | power up: FF      read/write

This register contains the the Least Significant 7 bits of the dependent graphics field height. This downcounter is loaded at the end of the dependent VSYNC strobe and counts the number of HSYNC strobes until zero. When loading a new vertical field count into the device this register should be loaded last. A write to this register loads both this value and the previous entered value for the MSB written to index register 10.

12: FIELD SWITCH DELAY

| 7 | 6 | 5 | 4 | 3 | 2 | 1 | 0 |
|---|---|---|---|---|---|---|---|
| 1 | | | | | | | | power up: 00      read/write

The FIELDSW signal may be delayed in relation to HSYNC in order to accomodate borders between HSYNC and the active graphics field or to accomodate clock delays within a color lookup table. The contents of this register is the number of CLKOUT clocks between the HSYNC strobe and FIELDSW going active. The trailing edge of FIELDSW is delayed by a similar amount.

ADVANCED INFORMATION

What is claimed is:

1. A genlock frequency generation system comprising:
   a phase locked loop receiving as inputs and synchronizing a dependent horizontal synchronization signal of a dependent video source to the horizontal synchronization signal of an independent video source, and having an output frequency, wherein the timing of said dependent video source is controlled either directly or indirectly by the output frequency of said phase locked loop;
   means for delaying one of the independent or dependent horizontal synchronization signals by a predictable amount of time before application to said phase locked loop for the purpose of establishing a known time difference between the independent and dependent horizontal synchronization signals;
   input switch means for switching the inputs to said phase-locked loop such that in a normal operating mode the independent and dependent horizontal synchronization signals are input to the phase-locked loop, and such that in a default operating mode a multiple of the output frequency of the phase-locked loop and a reference frequency signal are provided to the input of the phase-locked loop, so that in the default mode of operation the phase-locked loop establishes a new stable operating point based upon the reference frequency signal;
   synchronization detection means for detecting the presence and rate of the independent and dependent horizontal synchronization signals based on preset timing constraints, and for providing an output when the horizontal synchronization signals are not present or fall outside of an established range; and
   means for controlling the phase locked loop input switch based upon the output of the synchronization detection means such that if horizontal synchronization signals are not detected which fall within said preset timing constraints, said phase locked loop input switch will be set such that said reference frequency signal and said multiple of the output frequency of the phase-locked loop output are provided as inputs to the phase locked loop;
   and further comprising:
   means for establishing and generating a field switch control signal corresponding to a rectangular region completely contained within a field of the independent video source by controlling the amount of time difference between the horizontal and vertical synchronization signals of said independent and dependent video sources and by establishing a vertical line count and horizontal position count such that the dependent horizontal synchronization signal defines a left edge of said rectangular region, the horizontal position count establishes a right edge of said rectangular region by establishing a limit to the amount of horizontal scan after the left edge which will be applied to said rectangular region, the dependent vertical synchronization signal establishes a top edge of said rectangular region, and the vertical line count establishes a bottom edge of said rectangular region by establishing a number of scan lines after the top edge which will be applied to said rectangular region.

2. Apparatus according to claim 1, further comprising:
   means for determining and indicating synchronism of a vertical synchronization signal of a dependent video source and a vertical synchronization signal of an independent video source by determining that a horizontal synchronization signal from either the independent video source, the dependent video source, or both, does not occur between successive occurrences of the vertical synchronization signals of the dependent video source.

3. Apparatus according to claim 1, further comprising:
   means for delaying one of said vertical synchronization signals by a predictable amount of time prior to its application to said vertical synchronism determination means for the purpose of establishing a known time offset between the two vertical synchronization signals.

4. Apparatus according to claim 3, wherein:
   the predictable amount of time one of said vertical synchronization signals is delayed is programmable.

5. Apparatus according to claim 1, further comprising:
   means for determining that the phase locked loop is in a locked, stable condition.

6. Apparatus according to claim 1, further comprising:
   means for delaying said field switch control signal by a predictable amount of time.

7. Apparatus according to claim 1, further comprising:
   a programmable digital divider establishing the multiple of the output frequency of the phase-locked loop; and
   a programmable digital divider having the reference frequency signal as an input.

8. A method of synchronizing a dependent video source to an independent video source, comprising:
   providing horizontal sync signals from an independent video source and a dependent video source to inputs of a phase-locked loop, said phase-locked loop including a VCO generating an output;
   monitoring the presence and rate of the horizontal sync signals;
   providing, in a default mode of operation, the VCO output and a fixed frequency reference signal to the inputs of the phase-locked loop in the event that either of the horizontal sync signals are not present or fall outside of prescribed rate limits; and
   establishing and generating a field switch control signal corresponding to a rectangular region completely contained within a field of the independent video source by:
   controlling the amount of time difference between the horizontal and vertical synchronization signals of said independent and dependent video sources;
   by establishing a vertical line count and horizontal position count such that the dependent horizontal synchronization signal defines a left edge of said rectangular region;
   establishing a right edge of said rectangular region based on the horizontal position count by establishing a limit to the amount of horizontal scan after the left edge which will be applied to said rectangular region;
   establishing a top edge of said rectangular region based on the dependent vertical synchronization signal; and establishing a bottom edge of said rectangular region based on the vertical line count by establishing a number of scan lines after the top edge which will be applied to said rectangular region.

9. Method according to claim 8, further comprising:
providing vertical sync signals from the independent video source and the dependent video source;
phase shifting one of the horizontal sync signals to create a horizontal shift of the dependent video source in a video presentation of the two video sources; and
phase shifting a corresponding one of the vertical sync signals to create a vertical shift of the dependent video source in the video presentation of the two video sources.

10. Method according to claim 9, further comprising:
overriding the dependent video image within the independent video image to reveal the independent video image or to view another synchronous video image in a portion of the dependent video image.

11. Method according to claim 10, wherein:
a transparency signal is provided to define an inactive area in the dependent video image through which the independent video image is revealed or the other synchronous video image is viewed.

12. Method according to claim 8, further comprising:
monitoring lock of the phase-locked loop; and
interrupting the dependent video source based on loss of lock.

13. Method according to claim 12, further comprising:
continuing to monitor the presence and rate of the horizontal sync signals in the default mode; and
determining whether a return of lock in the phase-locked loop is due to either restoration of a missing or erroneous horizontal sync signal or to phase lock in the default mode.

* * * * *